Patented Oct. 29, 1935

2,019,419

UNITED STATES PATENT OFFICE 2,019,419

HYDROGENATION OF PYRIDINE BODIES

Wilbur A. Lazier, Marshallton, Del., assignor to E. I. du Pont de Nemours & Company, Wilmington, Del., a corporation of Delaware No Drawing. Application February 24, 1934, Serial No. 712,842. In Canada May 11, 1931

6 Claims. (Cl. 260—43)

This invention relates to catalytic processes, and more particularly to processes for the liquid phase hydrogenation of carbon compounds by means of metallic hydrogenating catalysts prepared by the reduction, or ignition and reduction, of chromates, molybdates, and similar salts.

Considerable work has been done in the field of catalytic chemistry with a view to developing improved catalysts for the hydrogenation of such unsaturated compounds as the olefins, unsaturated fats and fatty acids, benzene and its derivatives, and a large number of other compounds containing unsaturated functions, such as the aldehydes, nitriles, amides, and heterocyclic unsaturated rings. Most of this work has been based upon the classical discovery of Sabatier that finely divided metallic nickel is capable of causing the union of hydrogen with these compounds. The method has been further expanded and supplemented by the work of Ipatief on the application of high pressures to these reactions.

Extensive research has been carried out heretofore with the result that several different methods for the preparation of hydrogenation catalysts have been developed, the most common of which involve the precipitation and reduction of nickel hydroxide or carbonate, the reduction of nickel oxide prepared by ignition of the nitrate, anodic oxidation followed by reduction, heating certain organic salts of nickel to their decomposition temperature, and electrochemical deposition of metallic nickel.

Furthermore, various methods of reduction have been proposed, ranging from the ordinary dry reduction with hydrogen to reduction in an inert liquid vehicle or in the presence of the oil or other substance undergoing hydrogenation. As is well known, these catalysts have found extensive use in the commercial hydrogenation of fats, oils, and similar readily hydrogenated substances. I have found, however, that in general catalysts prepared by the above methods, although ordinarily suitable for the hydrogenation of fats and oils, may be entirely inadequate for the more difficult hydrogenation of such compounds as aldehydes, ketones, sugars, phenols, furfural and its derivatives, or benzene and pyridine and their homologues.

In my co-pending applications, Serial Nos. 456,298 and 456,299, filed May 27, 1930, of which the present application is a continuation-in-part, a class of hydrogenating metal catalysts is described which may be employed in these more difficult hydrogenations.

It is an object of the present application to cover broadly the catalytic hydrogenation set forth in my co-pending applications as related to the catalytic hydrogenation of compounds containing heterocyclic unsaturated rings. A further object is to provide a process for the hydrogenation of pyridine bodies in the liquid phase by the use of highly efficient hydrogenating metal catalysts prepared by reducing a composition comprising an oxide of a hydrogenating metal combined with a more acidic oxide such as a chromate, molybdate, or similar salt. A still further object is to provide such a process involving the use of reduced alkali-free hydrogenating catalysts of the above type. Another object is to provide a process for the hydrogenation of pyridine bodies by the use of highly efficient hydrogenating metal catalysts prepared by reducing a multiple salt of a hydrogenating metal and a nitrogen base. A more specific object is to carry out the hydrogenation of pyridine bodies by the use of reduced chromite catalysts derived from double chromates of ammonia and a hydrogenating metal. Other objects will appear hereinafter.

These objects are accomplished by bringing the unsaturated heterocyclic compound together with hydrogen into contact with a catalyst comprising essentially a hydrogenating metal which may be present at least partly in oxidized form and an oxidized form of a metallic oxide which is more acidic in character than the hydrogenating metal oxide.

By the term "hydrogenating metal" I refer to a metal which is capable of causing the union of hydrogen with a compound capable of hydrogenation with or without the splitting off of water. Included in this group of metals are iron, nickel, cobalt, copper, silver, tin, cadmium, lead and bismuth. As examples of the more acidic oxides may be mentioned oxides of such elements as are contained in sub-groups A of the fourth, fifth and sixth groups of the periodic table, for example, oxides of chromium, molybdenum, tungsten, vanadium, uranium and titanium.

It will be recognized that the nature of the catalysts, including their physical structure, chemical constitution, activity and efficiency, may vary according to the method of preparation. Furthermore, since complete chemical analysis of the catalysts is usually exceedingly difficult and in many cases impossible, the method of preparation is often the most satisfactory way of defining the catalysts.

One type of catalyst is that obtainable by the reduction of a reducible compound (e. g., a salt) of the hydrogenating metal, one component of which is an oxidized form of at least one metal forming a more acidic oxide. Among the salts which are especially suitable for the preparation of the hydrogenating catalysts of this invention may be mentioned the chromates and molybdates. These compounds may be prepared by precipitation, fusion, or in other ways well known to those skilled in the art. It is to be noted, however, that treatment of solutions of nickel salts with an equivalent amount of an alkali metal chromate according to prior art practice yields a precipitate of basic nickel chromate that always contains alkali metal chromate which can be leached out only after heating at a temperature sufficient to destroy the nickel chromate.

An especially desirable type of catalyst is that prepared by heating a multiple salt of a nitrogen base and a hydrogenating metal such as, for example, one of the double ammonium chromates, to its spontaneous decomposition temperature and thereby converting the chromate to a chromite. This conversion constitutes a species of reduction since the valence of the chromium atom has been changed from a higher to a lower value. This heating or ignition may be accompanied or followed, respectively, by the step of simultaneously or subsequently reducing the resulting chromite with hydrogen.

The following typical methods have been found suitable for the preparation of chromite catalysts according to the principles of my invention, but it is to be understood that the specific procedure disclosed is merely illustrative and may be varied within wide limits:

(1) Concentrated solutions of nickel chloride and neutral ammonium chromate are permitted to react at room temperature. Upon standing, a green crystalline salt of nickel ammonium chromate is formed. The solution is filtered with suction and the precipitate dried and heated slightly to start the decomposition reaction which thereafter proceeds spontaneously with the evolution of sufficient heat to leave a glowing residue probably consisting of combined nickel oxide and chromium oxide. This composition may be subsequently further reduced with hydrogen to produce the desired catalyst.

(2) Two molar solutions of nickel nitrate and ammonium chromate are mixed in equivalent amounts and heated to boiling, whereupon a brick-red precipitate of double nickel ammonium chromate is separated. Ammonia may be added to neutralize the acid solution formed by the precipitation and greatly improves the yield. As in Method (1) the double ammonium compound is heated slightly to occasion spontaneous decomposition and the resulting ignited product may be further reduced with hydrogen.

I have disclosed above the preparation of chromite catalysts by the spontaneous decomposition and reduction of double nickel ammonium chromate, which may be considered typical of the class of salts which I have described as multiple salts of hydrogenating metals and nitrogen bases. By the term "nitrogen base" I include, besides ammonium compounds, organic derivatives such as salts of pyridine, aniline and methyl amine. When heated, these organic derivatives behave in a manner similar to the ammonium derivatives and yield chromites which, upon reduction, possess the same catalytic properties.

With regard to the double ammonium compounds, it may be said that various formulæ have been assigned to these double salts by investigators. Cold concentrated solutions of nickel chloride and ammonium chromate yield a green salt to which investigators have assigned the formula $(NH_4)_2Ni(CrO_4)_2.6H_2O$, while more dilute solutions at higher temperatures give rise to the formation of a brick-red precipitate probably having the formula $(NH_4)_2Ni(CrO_4)_2.2NH_3$. Both of these compounds decompose spontaneously on heating and yield a product in which chromium is present in the trivalent form.

When prepared by Method (1) or (2), the nickel chromate is first converted to a nickel chromite composition which may be considered to consist of nickel oxide (NiO) and nickel chromite ($NiCr_2O_4$) in which the chromium is in the trivalent form. This composition may then be further reduced to a composition consisting of metallic nickel, nickel oxide and nickel chromite. In order to classify these compositions under a generic term, regardless of their method of preparation, they may be designated as nickel-chromium oxide catalysts or nickel chromites. However, by the term "chromite" I do not intend to define these compositions as definite chemical compounds, but as compositions in which the catalytically active component is a hydrogenating metal which may be either combined or associated with chromium in a lower state of oxidation. The hydrogenating metal may exist, either in the metallic form, or as an oxide, or both, the chemical relationships of the various elements in the composition depending to a certain extent upon the methods of preparation and reduction employed.

The nitrogen base compounds, typified by nickel ammonium chromate, are preferably heated slowly to start the reaction, after which they decompose spontaneously leaving a residue of nickel chromite. The spontaneous decomposition temperature will vary for the different compounds but, in general, it may be said to be from 200° C. to 400° C. Reduction of the resulting composition may be carried out at 400° C. to 600° C., preferably at 500° C.

The methods described above are equally applicable to the preparation of chromites of hydrogenating metals other than nickel, for example, other members of the ferrous group such as those of iron and cobalt. Tin ammonium chromate may be prepared by treating a solution of stannous chloride and strong hydrochloric acid with ammonium bichromate and neutralizing the mixture with ammonia. After reduction, the tin-chromium oxide complex becomes active for the hydrogenation of such compounds as nitrobenzene.

Similarly, a very active copper chromite preparation is formed by the interaction of equimolecular proportions of copper nitrate and normal ammonium chromate solutions, followed by ignition and reduction of the precipitate. Basic copper ammonium chromate is formed by the precipitation, which yields a complex mixture of copper oxide and copper chromite on ignition. Reduction yields a part of the copper in the active elementary form.

Other methods of preparing suitable catalysts, typified by nickel-chromium catalysts, are as follows:

(3) Sodium chromate and nickel sulfate solutions are allowed to react to form a brown precipitate of basic nickel chromate containing some sodium chromate. The resulting solution is filtered and the precipitate washed, dried, and ignited at a mild red heat. After cooling, the black residue containing partially combined nickel oxide and chromium oxide is extracted with hot water to remove any remaining alkali chromate. This oxide mixture is then reduced with hydrogen.

(4) Nickel oxide or carbonate is digested with chromic acid until completely dissolved. On evaporating the solution to dryness, the residue is reduced with hydrogen or is first heated to redness (representing a temperature in the vicinity of 800° C.) to convert it to the chromite form, followed by hydrogen reduction.

These compositions, typified by the chromates, may be ignited at temperatures ranging preferably from 600° C. to 800° C., although higher temperatures may be employed in special cases. Reduction of the ignited composition is then carried out preferably at a temperature of 500° C. The chromate may also be reduced directly at 500° C. without previous ignition, but I prefer to first ignite the material, since the resulting catalyst is more compact and convenient to handle. During the ignition of the class of compounds exemplified by the chromates, the chromium or like metal is reduced to the trivalent form, the nickel remaining at this stage of the preparation as nickel oxide. Further reduction by means of hydrogen reduces at least a part of the combined nickel to the active metallic form. It is also to be noted that simple hydrogen reduction of the chromate itself will eventually accomplish the same result.

I prefer to reduce salts of the ferrous metal group with hydrogen at temperatures of from 400° C. to 600° C., preferably at 500° C. Somewhat lower temperatures suffice for reduction of the non-ferrous hydrogenating metals.

Having outlined above the general principles of my invention, the following examples which are included merely for purposes of illustration and not as a limitation, disclose specific methods used in carrying the invention into practice and the improved results accruing from its use.

*Example I*

Seventeen hundred fifty (1750) parts of nickel nitrate were dissolved in 3000 parts of water and mixed with a solution of 750 parts of ammonium bichromate in an equal volume of water. The mixed solution was heated to 90° C. to 100° C. for thirty minutes with stirring, after which the brick-red precipitate formed was washed by decantation and dried. By analysis, the dried product contained 6.7% ammonia and 26.6% nickel, and most probably consisted of a complex double chromate of ammonia and nickel. This compound was ignited at 400° C. to drive off the ammonia and part of the oxygen in order to convert the compound to nickel chromite, and was then reduced for twelve hours in a stream of dry hydrogen at 500° C.

One hundred seventy-five (175) parts of pyridine were charged into a steel reaction vessel together with 14 parts of reduced nickel chromite prepared as above described. The contents of the vessel were agitated with an initial hydrogen pressure of 2000 pounds per square inch (about 136 atmospheres) while being heated to a temperature of approximately 190° C. At this temperature hydrogen absorption took place and continued while the temperature was raised to and maintained at 220° C. After approximately two and one-half hours, the hydrogen absorption was complete and distillation of the product resulted in the isolation of at least 85% of the theoretical yield of piperidine.

*Example II*

Instead of employing the catalyst of Example I, the process of Example I may be carried out with approximately the same proportions of a catalyst prepared by suspending 228 parts of pure nickel hydroxide in water, treating the suspension with 200 parts of chromic anhydride, filtering the resulting paste, drying and igniting four hours at 600° C., and thereafter reducing the residual nickel chromite composition over a period of twenty-four hours with hydrogen at 450° C. to 500° C.

*Example III*

Another catalyst suitable for carrying out the process of Example I may be prepared by dissolving 290 parts of nickel nitrate in 2000 parts of water, treating with an equal volume of water containing 194 parts of potassium chromate, heating the mixture to 90° C., then treating with a solution containing 56 parts of potassium hydroxide, decanting, washing and drying the precipitate, thereafter heating at a dull red heat for four hours, then cooling and again washing to free the composition from the last of the potassium chromate set free by the ignition, and reducing in hydrogen as outlined in Example II.

*Example IV*

The general procedure of Example I may be followed, except that the catalyst is substituted by an approximately equal amount of a catalyst comprising reduced nickel supported upon and partially combined with chromium oxide prepared by reducing with hydrogen at 400° C. a green double salt of nickel and ammonia having the probable formula $(NH_4)_2Ni(CrO_4)_2.6H_2O$.

*Example V*

A nickel chromite catalyst comprising reduced nickel supported upon and partially combined with chromium oxide was prepared by reducing with hydrogen at 400° C. to 450° C. a double salt of nickel and ammonia which may be more properly characterized as nickel-ammonium chromate. Eight parts of this reduced nickel chromite catalyst were added to 200 parts of a 20% solution of sodium picolinate in water. The salt solution and catalyst were charged into a pressure-resistant vessel and agitated with hydrogen under a pressure of 1200 pounds per square inch (about 82 atmospheres) while being heated to 175° C. Absorption began at a temperature of 175° C. and continued while the temperature was increased to 200° C. Hydrogen absorption was complete in three to four hours and yielded a solution of sodium pipecolinate (the sodium salt of 2-methyl-piperidine-carboxylic acid).

*Example VI*

Nickel molybdate was formed by treating a warm dilute solution of nickel nitrate with a solution containing an equal amount of ammonium molybdate. The acid formed during the reaction was neutralized by the addition of ammonium hydroxide. The precipitate was then filtered, washed, dried and reduced with hydrogen at 450° C. The resultant catalyst is effective in the hydrogenation of pyridine under the conditions given in Example I.

*Example VII*

The catalyst described in Example VI may be employed in the hydrogenation of sodium picolinate as described in Example V.

Example VIII

A copper-chromium oxide catalyst was prepared by igniting basic copper-ammonium chromate at 400° C. and reducing the resulting copper chromite in hydrogen at 300° C. to 350° C. for four hours. The catalyst may be employed in the hydrogenation of pyridine under the conditions described in Example I.

Example IX

The catalyst of Example VIII may be employed in the hydrogenation of sodium picolinate according to the procedure described in Example V.

Example X

One hundred (100) parts of furfural and 13 parts of water were shaken vigorously with 7 parts of a nickel chromite catalyst prepared by the reduction of nickel chromate with hydrogen at 450° C. to 500° C. under 1400 pounds hydrogen pressure and at a temperature of 80° C. to 110° C. The yield of tetrahydrofurfuryl alcohol was about 65%.

The invention is applicable to the hydrogenation of other unsaturated heterocyclic compounds than those given in the examples, including: 3-methyl-pyridine, 4-methyl-pyridine, 2-methyl-pyridine, 2,3-dimethyl-pyridine, 2,4-dimethyl-pyridine, 2,5-dimethyl-pyridine, 2,6-dimethyl-pyridine, 3,4-dimethyl-pyridine, 3,5-dimethyl-pyridine, 2-ethyl-pyridine, symmetrical 2,4,6-trimethyl-pyridine, 2,3,4-trimethyl-pyridine, 2,4,5-trimethyl-pyridine, 2-methyl-5-ethyl-pyridine, 2-methyl-6-ethyl-pyridine, 3-methyl-4-ethyl-pyridine, 2-propyl-pyridine, 4-isopropyl-pyridine, tetramethyl-pyridine, vinyl-pyridine, and higher alkyl pyridines; also, pyridine-2,3-dicarboxylic acid, pyridine-3,4-dicarboxylic acid, nicotinic acid, alpha-pyridyl-methyl-ketone, alpha-pyridyl-dimethyl-carbinol, beta-pyridyl-carbinol, gamma-benzyl-pyridine, alpha-aminopyridine, alpha-stearyl-pyridine, beta-aminopyridine, 2,6-diamino-pyridine, 2,3-diamino-pyridine, 3,5-dibenzyl-pyridine, gamma:gamma-dipyridyl, beta-phenyl-pyridine, 2-benzyl-pyridine, 4-pyridyl-phenyl-ethylene, 2-benzoyl-pyridine, 2-pyridyl-pyrrol, and the like. The invention is also applicable to the treatment of mixtures of pyridines and quinoline, isoquinoline and quinaldine.

The optimum temperatures and pressures may vary with the particular unsaturated heterocyclic compound treated. In general, the temperature range may vary from about 100° C. to about 300° C., although it is possible that, in some instances, higher or lower temperatures may be used provided suitable pressures are employed. For the hydrogenation of pyridine and homologues thereof temperatures within the range of about 175° C. to 225° C. and pressures of about 75 to 500 atmospheres are preferably employed. Once a pressure has been attained at which hydrogen absorption begins, there appears to be no upper limit as to the amount of pressure which may be used. Pressures of 100, 150, 200, 300, 400, 500 and 1000 atmospheres are suitable where apparatus capable of withstanding such pressures is available.

The hydrogenation may be carried out in the presence of diluents or solvents such as water, alcohols (e. g., methyl alcohol, ethyl alcohol, isopropyl alcohol and diethylene glycol), tetrahydronaphthalene (tetralin), hexahydronaphthalene, cyclohexane, hexahydrophenol, and various amines such as, for example, dibutyl-amine. The use of a solvent or diluent is especially desirable when the unsaturated heterocyclic body to be hydrogenated has a high melting point.

The proposed catalysts have several advantages. Not only is the catalyst very active, but it is also more capable of withstanding catalyst poisons, such as oxygen and sulfur, than known types of catalysts. This is presumably because of the potential supply of unreduced nickel or other catalytic hydrogenating metal which may be continuously activated under the conditions of hydrogenation. When badly poisoned, the supporting oxide (for example, chromium oxide) facilitates regeneration which is brought about by gentle ignition followed by reduction. Another advantage is that the materials of this invention lend themselves very readily to compression into a form that may be used in a continuous operation wherein the liquid to be hydrogenated is permitted to flow over the contact mass in the presence of hydrogen under pressure. Nickel and copper chromites, for example, are readily briquetted with the ordinary types of pharmaceutical tablet machinery without injury to the porosity or activity of the catalyst. It will be apparent that a continuous method of operation employing the catalysts of this invention offers many advantages over the usual autoclave process.

As many apparently widely different embodiments of this invention may be made without departing from the spirit and scope thereof, it is to be understood that I do not limit myself to the specific embodiments thereof except as defined in the appended claims.

I claim:

1. In a process of catalytic hydrogenation, the step which comprises bringing a pyridine body in liquid phase and hydrogen, under super-atmospheric temperature and pressure conditions, into contact with a catalyst comprising essentially a hydrogenating metal which may be present at least partly in oxidized form, and an oxidized form of a metal forming a metallic oxide more acidic in character than the hydrogenating metal oxide.

2. The process of claim 1 in which the pyridine body is an alkyl pyridine.

3. The process of claim 1 in which the catalyst is substantially alkali-free.

4. In a process of producing piperidine, the step which comprises bringing pyridine in liquid phase and hydrogen, under super-atmospheric temperature and pressure conditions, into contact with a reduced chromium oxide catalyst prepared by igniting basic copper-ammonium chromate at 400° C. and reducing the copper chromite in hydrogen at about 300° C. to about 350° C.

5. In a process of catalytic hydrogenation, the step which comprises bringing a pyridine body in liquid phase and hydrogen, under super-atmospheric temperature and pressure conditions, into contact with a catalyst prepared by heating a multiple chromate of a nitrogen base and a hydrogenating metal to its spontaneous decomposition temperature and thereafter reducing the resultant composition in hydrogen.

6. In a process of producing piperidine, the step which comprises bringing pyridine in liquid phase and hydrogen, under super-atmospheric temperature and pressure conditions, into contact with a catalyst comprising essentially a hydrogenating metal, which may be present at least partly in oxidized form, and an oxidized form of a metal forming a metallic oxide more acidic in character than the hydrogenating metal oxide.

WILBUR A. LAZIER.

CERTIFICATE OF CORRECTION.

Patent No. 2,019,419. October 29, 1935.

WILBUR A. LAZIER.

It is hereby certified that error appears in the heading to the printed specification of the above numbered patent requiring correction as follows: Line 7, strike out the words "In Canada May 11, 1931"; and that the said Letters Patent should be read with this correction therein that the same may conform to the record of the case in the Patent Office.

Signed and sealed this 17th day of December, A. D. 1935.

(Seal)

Leslie Frazer
Acting Commissioner of Patents.